(12) United States Patent  (10) Patent No.: US 8,864,003 B2
Lovett  (45) Date of Patent: Oct. 21, 2014

(54) MOTORCYCLE WINDSHIELD BAG

(75) Inventor: Terry Lovett, Newport Beach, CA (US)

(73) Assignee: Tucker-Rocky Corporation, Inc., Fort Worth, TX (US)

( * ) Notice: Subject to any disclaimer, the term of this patent is extended or adjusted under 35 U.S.C. 154(b) by 374 days.

(21) Appl. No.: 13/020,030

(22) Filed: Feb. 3, 2011

(65) Prior Publication Data

US 2011/0240698 A1  Oct. 6, 2011

Related U.S. Application Data

(60) Provisional application No. 61/301,299, filed on Feb. 4, 2010.

(51) Int. Cl.
*B62J 7/06* (2006.01)
*B62J 17/04* (2006.01)
*B62J 9/00* (2006.01)

(52) U.S. Cl.
CPC . *B62J 17/04* (2013.01); *B62J 9/003* (2013.01)
USPC ............................. 224/413; 224/420; 224/435

(58) Field of Classification Search
USPC ......... 224/412, 413, 419, 420, 428, 433–439; D12/407; 296/78.1; 383/7, 16, 21, 26, 383/11, 13
See application file for complete search history.

(56) References Cited

U.S. PATENT DOCUMENTS

| | | | | |
|---|---|---|---|---|
| D287,237 S * | 12/1986 | Abe | ............................. | D12/410 |
| 5,465,884 A * | 11/1995 | Bohl et al. | .................... | 224/407 |
| D384,030 S * | 9/1997 | Lazzeroni et al. | ........... | D12/422 |
| 5,881,936 A * | 3/1999 | Li | ................................. | 224/413 |
| 6,338,260 B1 * | 1/2002 | Cousins et al. | .................... | 70/2 |
| 6,505,765 B1 * | 1/2003 | Proctor et al. | ................ | 224/413 |
| 6,647,121 B2 * | 11/2003 | Stanberry et al. | ............... | 381/86 |
| 6,808,096 B1 * | 10/2004 | Salasny, Sr. | ................... | 224/413 |
| D605,104 S * | 12/2009 | Englehart, Jr. | ............... | D12/407 |
| 2005/0230445 A1 * | 10/2005 | Woo | ............................... | 224/576 |
| 2010/0012695 A1 * | 1/2010 | DeMilio | ........................ | 224/413 |
| 2010/0117392 A1 * | 5/2010 | Kendall | ........................ | 296/37.1 |

* cited by examiner

*Primary Examiner* — Justin Larson
*Assistant Examiner* — Scott McNurlen
(74) *Attorney, Agent, or Firm* — Gardere Wynne Sewell LLP

(57) ABSTRACT

The present invention is a vehicle accessory and specifically a removable bag that can be securely fastened to a windshield frame of a motorcycle. The motorcycle windshield bag further includes a back wall, having at least four holes positioned approximately in each corner of the bag and a metal grommet; two side walls; a top portion having a flap; and a front wall defined by a curved surface having a first part and a second part of equal elevation relative to an indented portion, wherein the indented portion provides a space that conforms to a motorcycle handlebar clamp while still maximizing internal bag space.

11 Claims, 14 Drawing Sheets

US 8,864,003 B2

MOTORCYCLE WINDSHIELD BAG

CROSS-REFERENCE TO RELATED APPLICATIONS

The present invention relies on U.S. Provisional Patent No. 61/301,299, entitled "Motorcycle Windshield Bag" and filed on Feb. 4, 2010, for priority and is herein incorporated by reference in its entirety.

FIELD OF THE INVENTION

The present invention relates generally to the field of vehicle accessories, and, more specifically, to a removable bag that can be securely fastened to a windshield frame of a motorcycle.

BACKGROUND OF THE INVENTION

Conventionally motorcycles, or motor bikes, have a very limited capacity for storage. Motorcycles typically have a nominal trunk incorporated into the structure of the motorcycle itself. There are limitations, however, to the amount of luggage which can be stored in a typical motorcycle trunk. Specifically, most trunks are limited in size and unable to accommodate an extensive amount of luggage. In addition, trunk space is usually located in the rear of or on the sides of the motorcycle, often making it inconvenient for the driver to access smaller personal effects, such as a wallet, sunglasses, cosmetics, etc. Accordingly, motorcycle riders, or bikers, are faced with the challenge of how best to carry luggage and other items that cannot be accommodated in the trunk.

Certain motorcycles, such as manufactured and branded by Harley Davidson®, are provided with a windshield supported by a metal frame. FIGS. 1A and 1B illustrate a conventional windshield and frame that may be mounted on a motorcycle. The windshield 102 is attachable to the front fork assembly of a motorcycle using the metal frame 104. The metal frame 104 comprises a curved horizontal bar 106, two curved vertical bars 108 and 110, and two fasteners 112, 114 coupled with the vertical bars 108 and 110 respectively. While fasteners 112, 114 may incorporate a plurality of different structures, in one embodiment, as shown in FIG. 1B, the fasteners 112, 114 comprise a member extending vertically downward and terminating in a latch, hook, or other curved structure 112a that can couple to a portion of the motorcycle. As further illustrated in FIG. 1B the windshield 102 is attached to the horizontal bar 106 and the vertical bars 108, 110 by using a plurality of acorn nuts 132, 134, 116, 118, 120, 122, 124, 126 and 128. The horizontal bar 106 and the headlight housing of the motorcycle defines a vertical space that, in theory, could be used to store materials.

Small slim-line windshield bags are available for attachment on motorcycles equipped with windshields 102 as described above. Conventional bags are shallow in depth because they are structurally constrained from occupying the entire space between horizontal bar 106 and the headlight housing. It would therefore be desirable to have a spacious windshield bag which may be securely attached to the windshield metal frame and that can occupy substantially all of the available volume defined by the space between the headlight housing and the horizontal support bar 106 of the windshield.

SUMMARY OF THE INVENTION

The present specification discloses a removable motorcycle windshield bag, having an interior volume, comprising: 1) a back wall defined by a planar surface, a) wherein said planar surface has a left edge with a top side and bottom side, a right edge with a top side and bottom side, and a top edge with a left side and a right side, b) wherein said top side of the left edge and left side of the top edge form, in combination, a left corner, c) wherein said top side of the right edge and right side of the top edge form, in combination, a right corner, d) wherein a first access area is positioned in the right corner, e) wherein a second access area is positioned in the left corner, f) wherein a third access area is positioned in the bottom side of the right edge; and g) wherein a fourth access area is positioned in the bottom side of the left edge, 2) a left side wall attached to said left edge, 3) a right side wall attached to said right edge, 4) a top wall attached to the back wall; and 5) a front wall attached to the left side and right side, wherein a) said front wall is defined by a surface having a first portion, a second portion, and a third portion that is indented relative to said first portion and second portion and positioned between said first portion and said second portion; b) the interior volume of the bag defined by the indented portion, top wall, and back wall is less than the interior volume of the bag defined by the first portion, top wall, and back wall; c) the interior volume of the bag defined by the first portion, top wall, and back wall is equal to the interior volume of the bag defined by the second portion, top wall, and back wall; and d) the third portion is adapted to receive a motorcycle handlebar clamp.

The width of the bag defined by the distance from the first portion of the front wall to the back wall is equal to the width of the bag defined by the distance from the second portion of the front wall to the back wall. The width of the bag defined by the distance from the first portion of the front wall to the back wall is greater than the width of the bag defined by the distance from the third portion of the front wall to the back wall. The top wall comprises a flap that is contiguous with the back wall. The top wall comprises a flap that is hinged to the back wall. The flap is secured to the first portion of the front wall using a fastening means. The flap is secured to the second portion of the front wall using a fastening means. The fastening means comprises zippers, snaps, Velcro, or buttons.

The right side wall or left side wall further comprises a wire pass-through, wherein said wire pass-through comprises a space covered by a cross-hatched plastic cover. At least one of the first, second, third or fourth access areas comprises at least one of a hole, a void, an indentation, a recess, or a space covered by stretchable fabric, wherein said fabric is adapted to be displaced by a protruding nut head without causing said bag to be moved away from a windshield metal frame. The Velcro strip is attached to at least one of the left edge of the back wall, a right edge of the back wall, or a top edge of the back wall.

The back wall is attached to the top wall by a hinge and wherein a metal grommet is positioned under said hinge. The bag comprises at least one of nylon with a polyurethane coating, nylon with an ultraviolet protected coating, coil zippers, or nylon thread.

The present application discloses a method for securing a removable motorcycle windshield bag to a motorcycle windshield comprising the steps of 1) removing a detachable windshield supported by a metal frame from a motorcycle; 2) opening a top wall of the windshield bag to access at least one interior hole in a back wall; 3) placing the windshield bag between vertical bars located on the windshield frame so that a center metal grommet in the back wall aligns with a center acorn nut provided on a horizontal bar on the windshield frame; 4) removing the center acorn nut on the windshield frame; 5) removing adhesive portions of Velcro strips from the back wall of said windshield bag and aligning with the windshield metal frame for subsequent attachment; 6) aligning the back wall of the bag with the windshield bag such that bolt heads and acorn nuts of the windshield align with access areas on the back wall of the bag; 7) adhering the Velcro strips to the windshield frame; 8) replacing the center acorn nut on the windshield frame; and 9) reinstalling the windshield onto the motorcycle.

The method further comprises the step of preparing the windshield frame to accept adhesive Velcro strips, wherein said preparation step comprises cleaning the frame surface with rubbing alcohol. The Velcro strips are attached to the windshield frame surfaces in a manner to substantially cover the frame surfaces except for the nuts. The step of replacing the center acorn nut on the windshield frame further includes using blue locktight.

BRIEF DESCRIPTION OF THE DRAWINGS

These and other features and advantages of the present invention will be appreciated, as they become better understood by reference to the following detailed description when considered in connection with the accompanying drawings, wherein.

DETAILED DESCRIPTION OF THE INVENTION

The present invention provides a removable windshield bag that is securely attachable to a windshield frame of a motorcycle. In an embodiment, the bag is attachable to the windshield frame of a Harley Davidson® motorcycle. In other embodiments, the windshield bag may be attached to other similar models of motorcycle with suitable modifications as would be apparent to a person of ordinary skill in the art.

The present invention is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In various embodiments of the present invention, the windshield bag is made from a durable weather resistant material commonly known in the art, such as 1680D Nylon with a polyurethane coating and ultra-violent protected coating to minimize sun fading, YKK coil zippers, and/or nylon thread.

Figure 2:
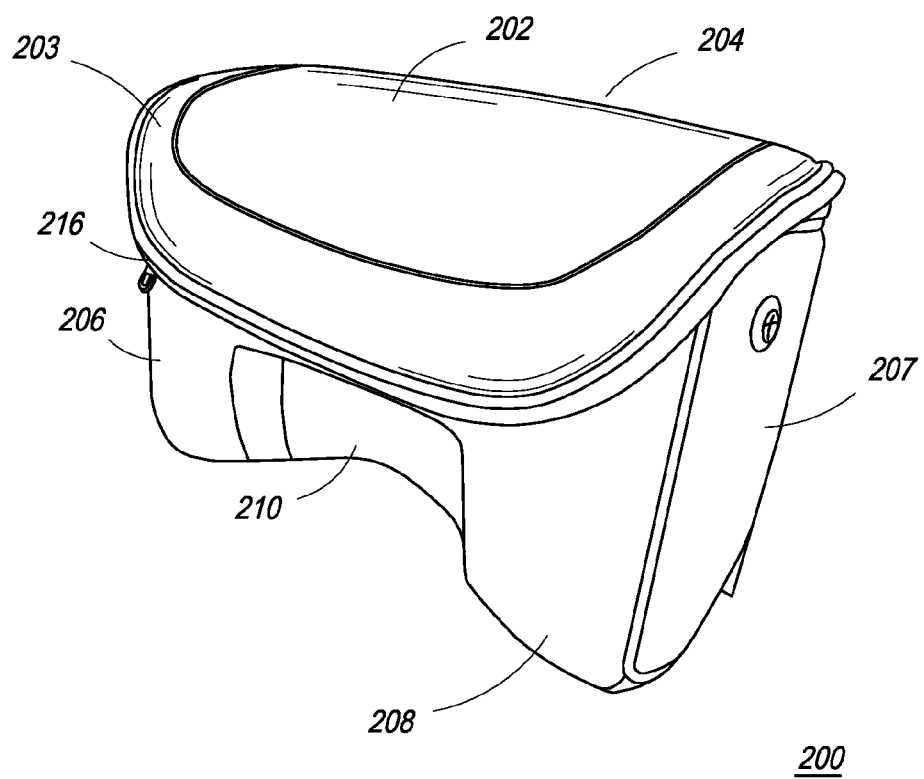
FIG. 2 illustrates a removable windshield bag, in accordance with an embodiment of the present invention.

FIG. 2 illustrates the removable windshield bag, in accordance with an embodiment of the present invention. The bag is substantially rectangular in shape with a curve in the lower portion allowing the bag to fit around a handle clamp of a motor bike. It should be appreciated that the bag is designed to be securely, but removably, inserted into a space defined by a motorcycle's headlight, the windshield, the motorcycle handlebars, the windshield crossbar 106, and the windshield vertical supports 110, 108.

Referring to FIG. 2, windshield bag 200 comprises a back wall 204, two side walls 216, 207, and a front wall defined by a curved surface having a first part 206 and a second part 208 of equal elevation relative to an indented portion 210. The indented portion 210 serves to provide a space that will snugly conform to, or otherwise provide a tight fit around, the motorcycle handlebar clamp while still maximizing internal bag space. The width of the bag defined by the distance from the first part 206 of the front wall to the back wall 204 is equal to the width of the bag defined by the distance from the second part 208 of the front wall to the back wall 204 and greater than the width of the bag defined by the distance from the indented part 210 of the front wall to the back wall.

Figure 11:
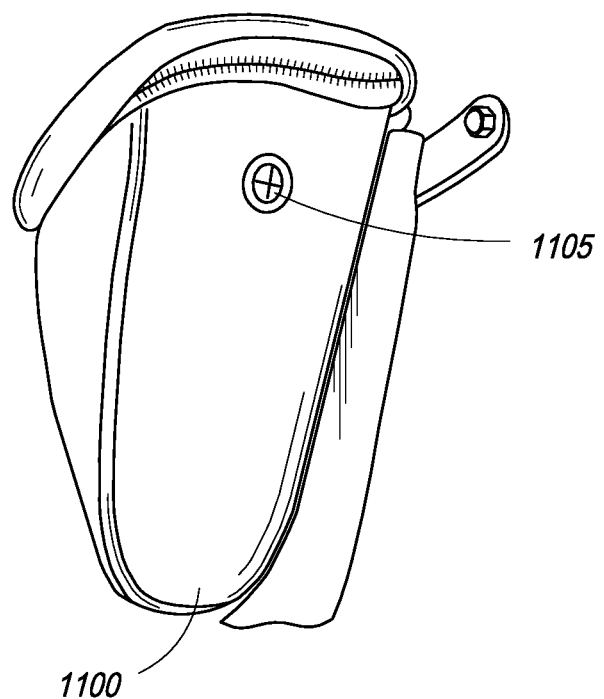
FIG. 11 illustrates a second side view of the windshield bag installed on a windshield metal frame, in accordance with an embodiment of the present invention.

The top portion of the bag 202 is defined by a front flap 203 which may be securely fastened to the first part 206 and/or second part 208 of the front wall using any fastening means, including zippers, snaps, Velcro, or buttons, thereby preventing any article stored within the bag from falling out (due to motion of the motor bike) while the flap is fastened. In one embodiment, side walls 207 and 216 comprise wire passthroughs (not shown in FIG. 2), which are protected using plastic cross-hatched openings. Such openings, also shown as 1105 on sidewall 1100 in FIG. 11, can be used to pass headphone wires, or other types wires, so that a rider may securely listen to a portable audio device such as an iPod. In operation, the right headphone is passed through the right cross-hatched plastic sidewall opening while the left headphone is passed through the left cross-hatched plastic sidewall opening.

Figure 1A:
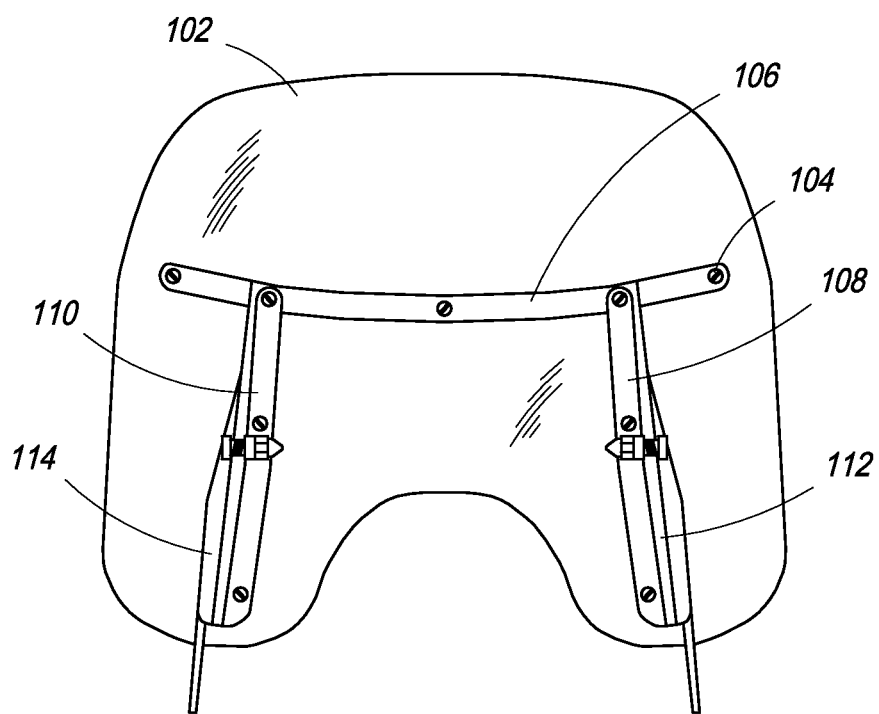
FIG. 1A illustrates a conventional windshield and frame that may be mounted on a motorcycle.
Figure 1B:
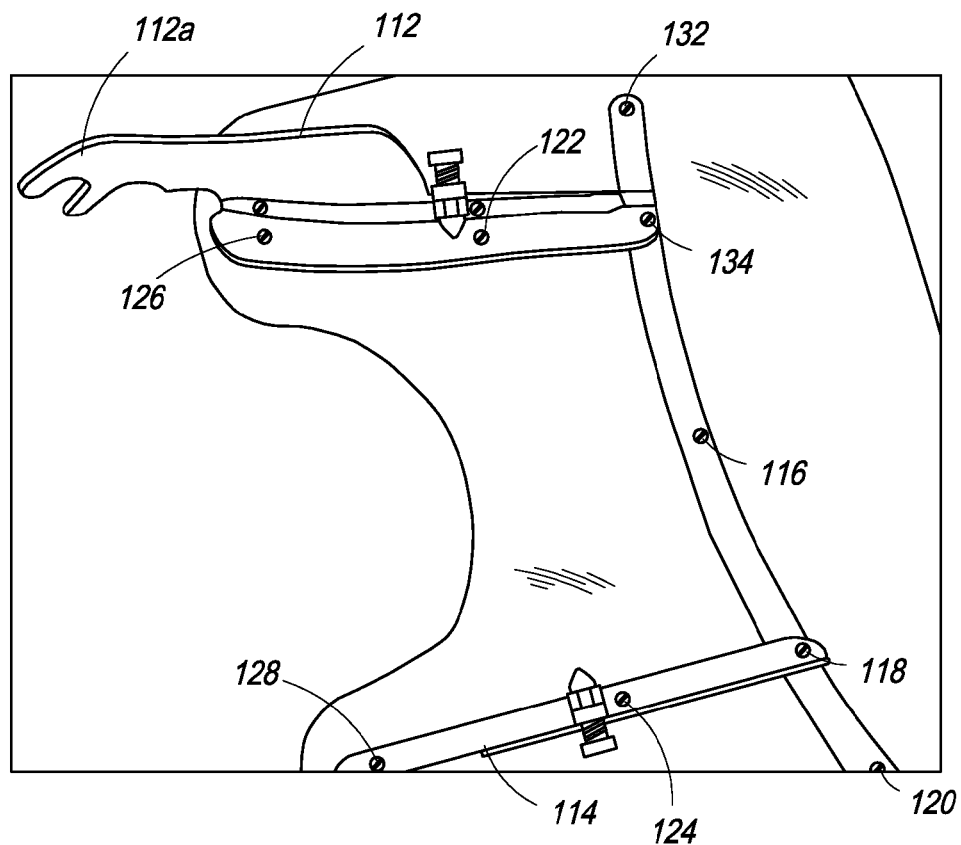
FIG. 1B illustrates another view of the conventional windshield and frame that may be mounted on a motorcycle.
Figure 3A:
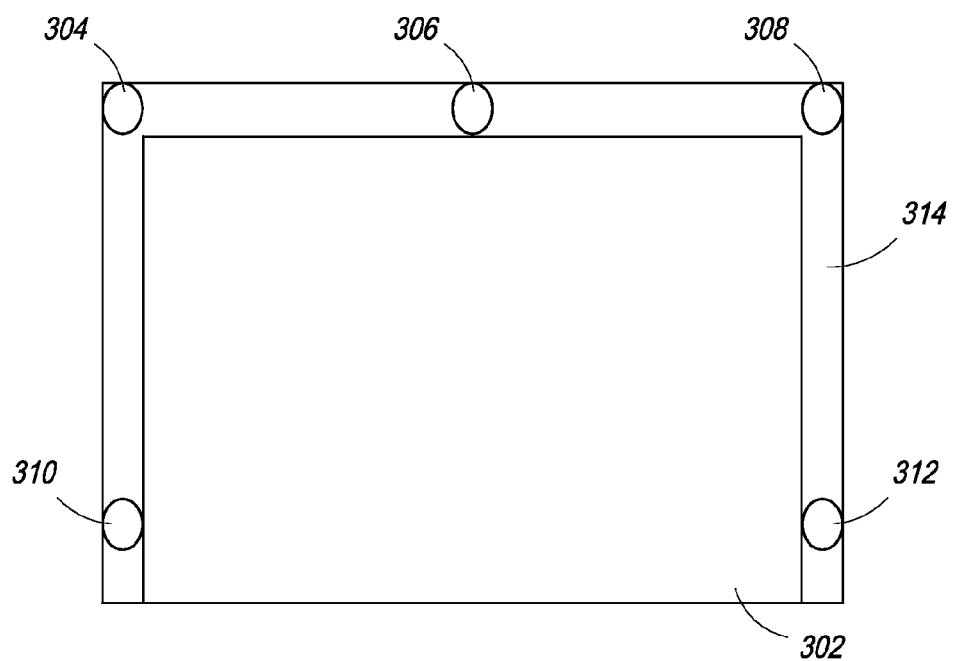
FIG. 3A illustrates a back view of the windshield bag, shown in FIG. 2, in accordance with an embodiment of the present invention.

FIG. 3A illustrates a schematic back view of the windshield bag, in accordance with an embodiment of the present invention. The back wall 302 of the bag is provided with four holes, recesses, or indentations 304, 308, 310, and 312 located approximately in each corner of the bag, through which acorn nuts, such as 118, 122, and 124 and 134 (as shown in FIG. 1B), can be positioned and substantially extend. It should be appreciated that, while the term "hole" is used, the access areas 304, 308, 310, and 312 can be indentations, recesses, or spaces covered by stretchable fabric which are easily displaced in order to accommodate a protruding nut head and thereby prevent the protruding nut head from pushing the bag away from the windshield metal frame and hinder the Velcro from attaching.

Figure 3B:
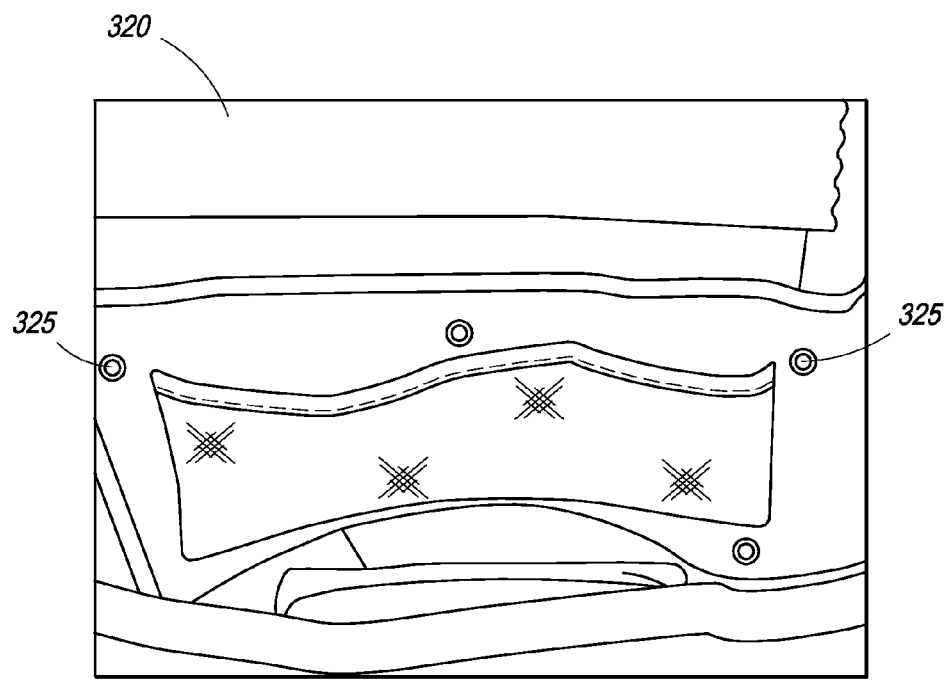
FIG. 3B illustrates holes in the back of the windshield bag.

As shown in FIG. 3B the back wall 320 has holes or openings 325 through which acorn nuts pass. Because the four (4) holes in the back wall of the bag allow the windshield frame acorn nuts to go through the wall of the bag, they allow the bag to lay flat against the windshield frame. The provision of holes in the back wall of the bag also enables the bag to stretch lower without being inhibited by acorn nuts 122 and 124 (shown in FIG. 1B), thereby providing a larger volume for storage. Prior art windshield bags are much slimmer in dimension as they stretch only halfway between the acorn nuts 122 and 134 (shown in FIG. 1B). Velcro strips (not shown) are provided on three sides of the exterior back wall of the removable bag to enable securely attaching the bag to the windshield metal frame.

Figure 3C:
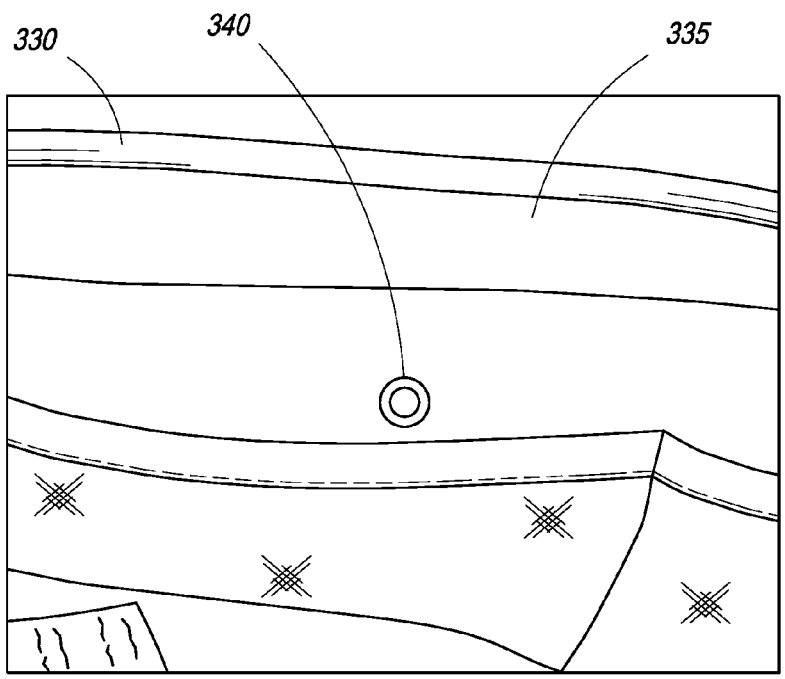
FIG. 3C illustrates the center grommet in the back of the windshield bag.

To further secure the windshield bag to the metal frame, a metal grommet, shown as 306 in FIG. 3A and 340 in FIG. 3C, is provided in the back wall 330 of the bag and preferably under the hinge 335 connecting the back wall 330 and bag flap. Operationally, a bolt passes through the metal grommet 306 depicted in FIG. 3A (340 in FIG. 3C) and an acorn nut is used to secure the bag, via the metal grommet, to the windshield.

Figure 4A:
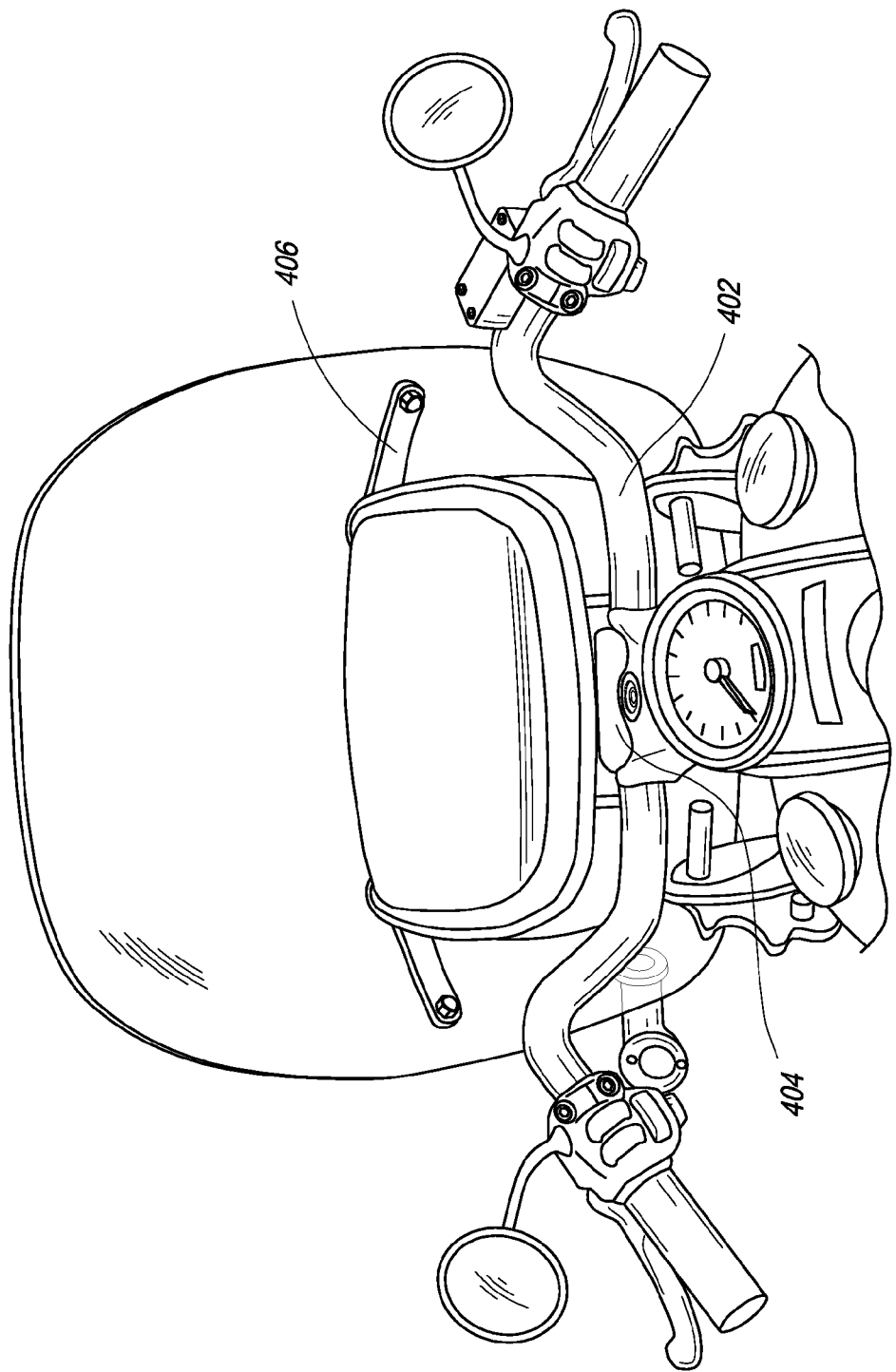
FIG. 4A illustrates the removable windshield bag fitted on a motorcycle, in accordance with an embodiment of the present invention.
Figure 4B:
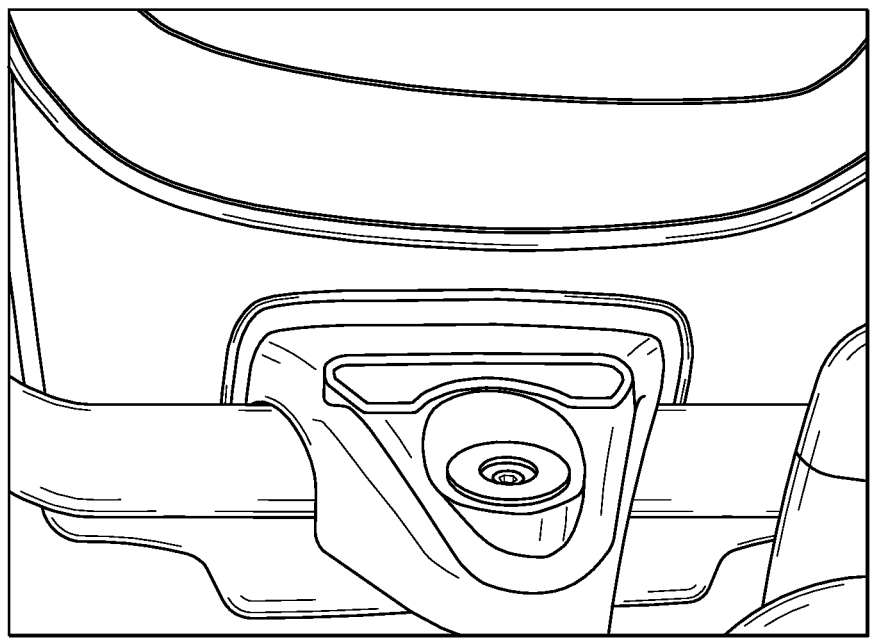
FIG. 4B illustrates another view of the windshield bag fitted on a motorcycle, in accordance with an embodiment of the present invention.

FIG. 4A illustrates the removable bag fitted on a motorcycle, in accordance with an embodiment of the present invention. The windshield bag provided by the present invention is fitted around the handle bar clamp 404 holding handlebars 402 in place, between the vertical windshield frame rails 108 and 110 (FIG. 1A) using all of the vertical space between the headlight and the horizontal windshield frame bar 406. FIG. 4B illustrates another view of the windshield bag fitted on a motorcycle, in accordance with an embodiment of the present invention, showing a close-up view of the bag fitted around the handle bar clamp 404, noting that the indented portion 408, serves to provide a space that will snugly conform to, or otherwise provide a tight fit around, the motorcycle handlebar clamp while still maximizing internal bag space.

Figure 5:
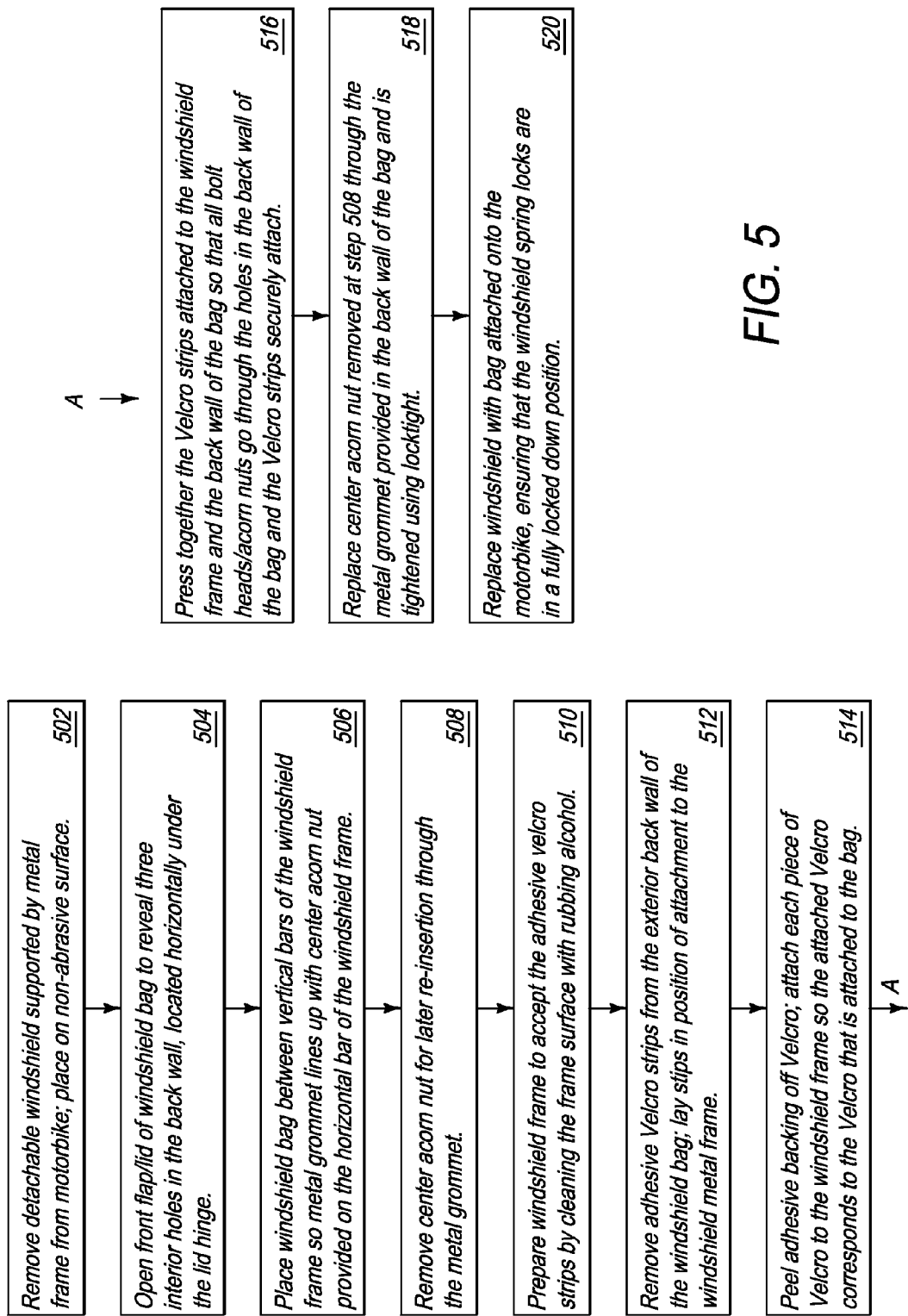
FIG. 5 is a flow diagram describing steps for attaching the windshield bag of the present invention to a windshield frame of a motorcycle, in accordance with an embodiment of the present invention.

FIG. 5 is a flow diagram describing steps for attaching the removable bag of the present invention to a windshield frame of a motorcycle. Referring now to FIGS. 1A, 1B, 2, 3A, 3B, 3C and 5 together, at step 502, a detachable windshield 102 supported by a metal frame 104 is removed from a motorcycle and is placed on a non-abrasive surface. At step 504, a front flap/lid of the windshield bag of the present invention is opened to reveal three interior holes 304, 306 and 308 in the back wall, located horizontally under the lid hinge. It should be observed that only the center hole 306 is provided with a metal grommet.

At step 506, the windshield bag is placed between the vertical bars 108 and 110, of the windshield frame so the metal grommet aligns with the center acorn nut 116 provided on the horizontal bar 106 of the windshield frame 104. At step 508, the center acorn nut 116 is removed for later re-insertion through the metal grommet. In various embodiments of the present invention, only one bolt 116 of the windshield metal frame has to be removed for installation. The other four holes (304, 308, 310 and 312) in the back wall of the bag allow the factory installed acorn nuts 134, 118, 122 and 124 to fit through the back wall of the bag. Accordingly, in a preferred embodiment, only a center hole in the windshield bag has a metal grommet and is physically, removably attached to the windshield via acorn nut 116, while all other acorn nuts align to, and fit within, holes (or recesses, space, indentations, as described above) in the windshield bag, but are not actively attached.

Figure 6:
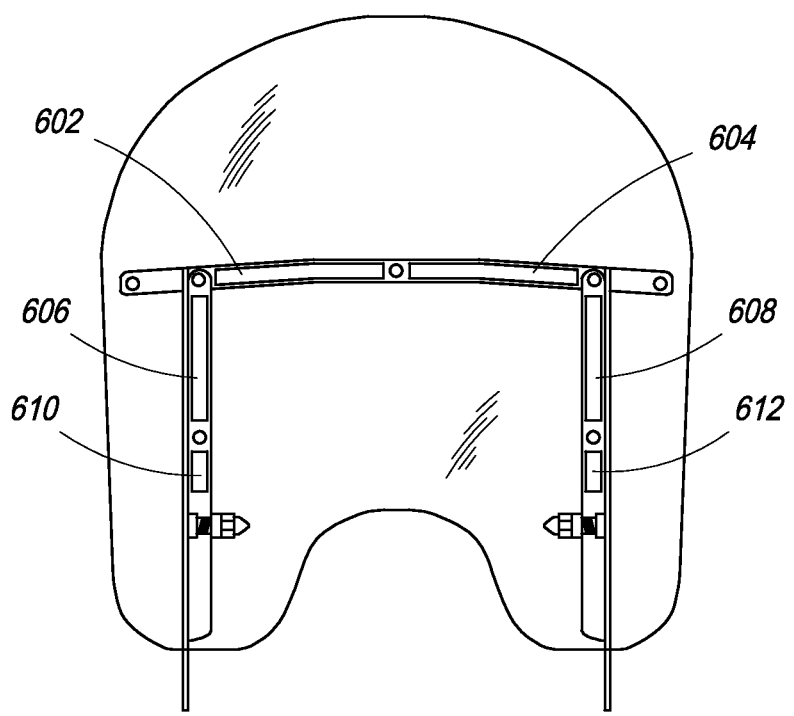
FIG. 6 illustrates the positions of attachment of the Velcro strips on to the windshield metal frame.

At step 510, the windshield frame 104 is prepared by rubbing the portion which attaches to the back wall of the bag with alcohol. In various embodiments, at least six Velcro strips are provided, along with the removable windshield bag, for attaching on to the windshield metal frame 104. FIG. 6 illustrates the positions of attachment of the Velcro strips on to the windshield metal frame.

Referring back to FIG. 5, at step 512, adhesive portions of Velcro strips are removed from the exterior back wall of the windshield bag and are laid in position of attachment to the windshield metal frame. Note that the other half of the Velcro strips remains attached to the windshield bag for subsequent attachment of the Velcro portions.

At step 514, the backing of the Velcro strips is peeled off and each piece of Velcro is attached to the windshield frame, at positions 602, 604, 606, 608, 610 and 612 as shown in FIG. 6. In an embodiment, the Velcro strips attached to the top horizontal bar at positions 602 and 604 are placed in a manner such that the edges of the Velcro strips are at a distance of 1/16" from the top edge of the horizontal bar. It should further be appreciated that the Velcro strips are attached to the windshield metal frame surfaces in a manner to substantially cover the metal frame surfaces, except for the nuts.

Figure 7:
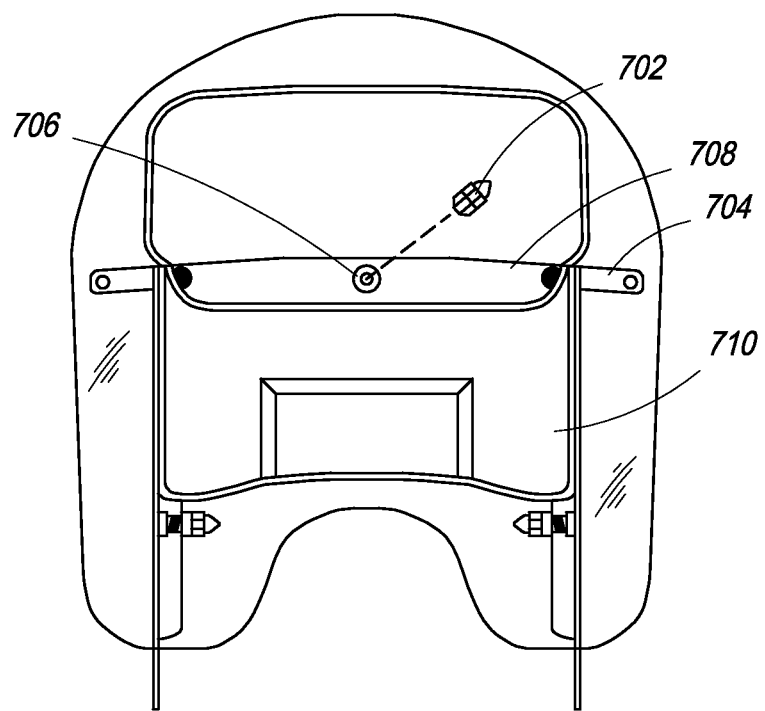
FIG. 7 illustrates the position of the windshield bag with respect to the windshield metal frame.

The bag is positioned such that the empty bolt hole of the windshield metal frame aligns with the metal grommet provided in the back wall of the bag. FIG. 7 illustrates the position of the windshield bag with respect to the windshield metal frame. Bolt 702 of the horizontal bar 704 of the windshield metal frame is removed and then reinserted through the metal grommet 706 provided in the back wall 708 of the removable bag 710. At step 516 the Velcro strips attached to the windshield frame and the Velcro strips attached to the back wall of the bag are pressed together such that all bolt heads/acorn nuts align with, and fit through, the holes in the back wall of the bag and the Velcro strips securely attach.

At step 518 the center acorn nut 116 removed at step 508 is replaced through the metal grommet provided in the back wall of the bag and is tightened using blue locktight, which is a color paste that, when applied, will assist in substantially locking a nut and bolt together so they will not vibrate loose. At step 520, the windshield with the removable bag is replaced on the motorcycle ensuring that the windshield spring locks are in a fully locked down position.

Figure 8:
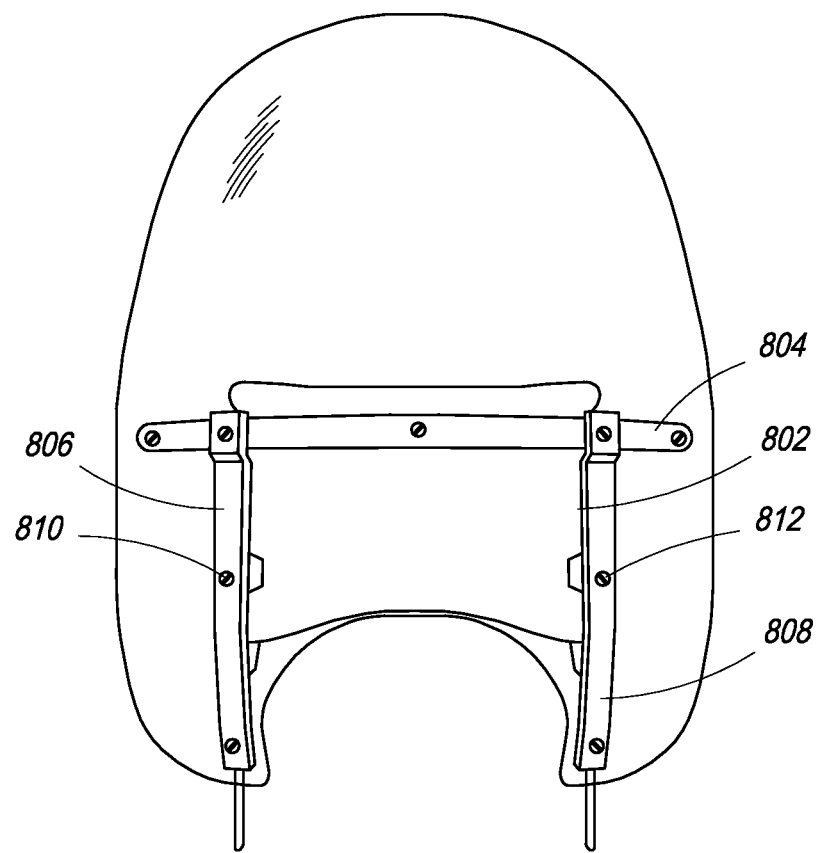
FIG. 8 illustrates a rear view of the windshield bag installed on a windshield metal frame, in accordance with an embodiment of the present invention.

FIG. 8 illustrates a view of the windshield bag as installed on a windshield metal frame, in accordance with an embodiment of the present invention. The back wall 802 of the bag is secured to the horizontal metal frame 804 and the vertical metal frame 806, 808 bars of the windshield frame. As illustrated in FIG. 8 the bag stretches the entire distance between the vertical bars 806 and 808. Also the bag extends downward beyond the acorn nuts 810 and 812, instead of being inhibited. The acorn nuts 810 and 812 provided on the vertical bars 808 and 806 pass through holes provide in the back wall of the windshield bag.

Figure 9:
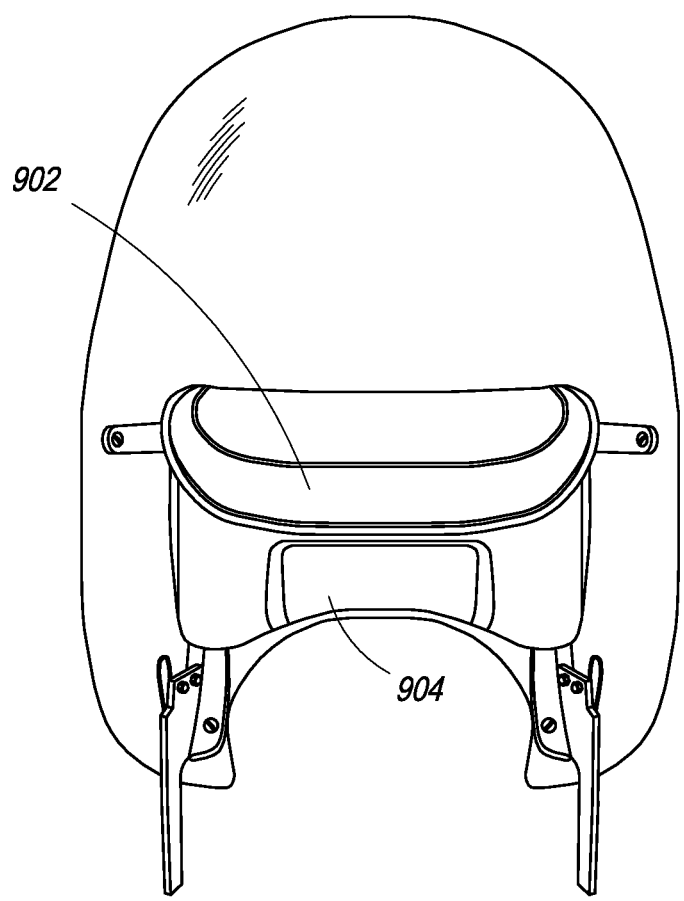
FIG. 9 illustrates a front view of the windshield bag installed on a windshield metal frame, in accordance with an embodiment of the present invention.
Figure 10:
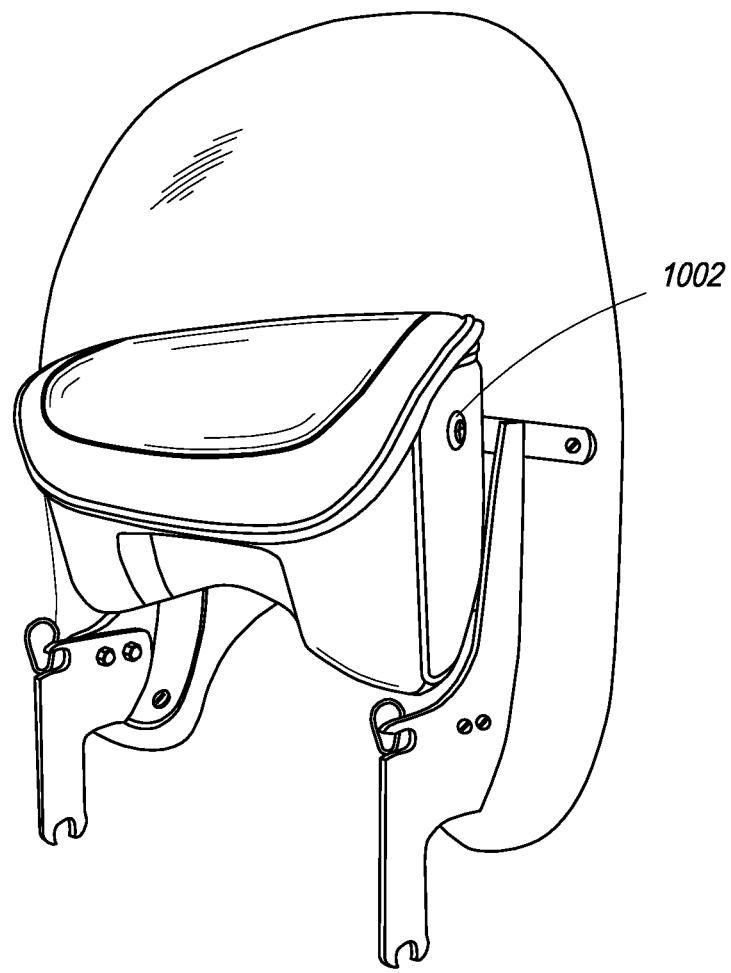
FIG. 10 illustrates a side view of the windshield bag installed on a windshield metal frame, in accordance with an embodiment of the present invention.

FIG. 9 illustrates another view of the windshield bag installed on a windshield metal frame, in accordance with an embodiment of the present invention. The flap 902 of the bag is securely fastened on to the front wall 904, using any type of attachment means such as zippers, Velcro, snaps, and buttons, in order to prevent an item stored therein to fall out. FIG. 10 illustrates a side view of the windshield bag installed on a windshield metal frame, in accordance with an embodiment of the present invention. An opening 1002, present on both the right and left side walls, is provided to act as a protected wire pass-through for headphones attached to portable devices such as iPod.

Hence the windshield bag provided in the present invention provides an alternate means of storage on a motorcycle by providing a removable spacious windshield bag. While the exemplary embodiments of the present invention are described and illustrated herein, it will be appreciated that they are merely illustrative. It will be understood by those skilled in the art that various changes in form and detail may be made therein without departing from or offending the spirit and scope of the invention.

I claim:

1. A removable motorcycle windshield bag, having an interior volume, comprising:
    a. a back wall defined by a planar surface:
        i. wherein said planar surface has a left edge with a top side and bottom side, a right edge with a top side and bottom side, and a top edge with a left side and a right side,
        ii. wherein said top side of the left edge and left side of the top edge form, in combination, a left corner,
        iii. wherein said top side of the right edge and right side of the top edge form, in combination, a right corner,
        iv. wherein a first access area is positioned in the right corner,
        v. wherein a second access area is positioned in the left corner,
        vi. wherein a third access area is positioned in the bottom side of the right edge;
        vii. wherein a fourth access area is positioned in the bottom side of the left edge; and
        viii. wherein a Velcro strip is attached to at least one of the left edge of the back wall, the right edge of the back wall, or the top edge of the back wall;
    b. a left side wall attached to said left edge;
    c. a right side wall attached to said right edge;
    d. a top wall attached to the back wall; and
    e. a front wall attached to the left side and right side, wherein:
        i. said front wall is defined by a surface having a first portion, a second portion, and a third portion that is indented relative to said first portion and second portion and positioned between said first portion and said second portion;
        ii. the interior volume of the bag defined by the indented portion, top wall, and back wall is less than the interior volume of the bag defined by the first portion, top wall, and back wall;
        iii. the interior volume of the bag defined by the first portion, top wall, and back wall is equal to the interior volume of the bag defined by the second portion, top wall, and back wall; and
        iv. the third portion is adapted to receive a motorcycle handlebar clamp.

2. The removable motorcycle windshield bag of claim 1 wherein a width of the bag defined by a distance from the first portion of the front wall to the back wall is greater than a width of the bag defined by a distance from the third portion of the front wall to the back wall.

3. The removable motorcycle windshield bag of claim 1 wherein a width of the bag defined by a distance from the first portion of the front wall to the back wall is equal to a width of the bag defined by a distance from the second portion of the front wall to the back wall.

4. The removable motorcycle windshield bag of claim 1 wherein the top wall comprises a flap that is contiguous with the back wall.

5. The removable motorcycle windshield bag of claim 1 wherein the right side wall or left side wall further comprises a wire pass-through, wherein said wire pass-through comprises a space covered by a cross-hatched plastic cover.

6. The removable motorcycle windshield bag of claim 1 wherein at least one of the first, second, third or fourth access areas comprises at least one of a hole, a void, an indentation, a recess, or a space covered by stretchable fabric, wherein said fabric is adapted to be displaced by a protrusion without causing said bag to be moved away from a windshield metal frame.

7. The removable motorcycle windshield bag of claim 1 wherein the back wall is attached to the top wall by a hinge and wherein a metal grommet is positioned under said hinge.

8. The removable motorcycle windshield bag of claim 1 wherein the bag comprises at least one of nylon with a polyurethane coating, nylon with an ultraviolet protected coating, coil zippers, or nylon thread.

9. The removable motorcycle windshield bag of claim 1 wherein the top wall comprises a flap that is hinged to the back wall, and wherein the flap is secured to the first portion of the front wall using a fastening means.

10. The removable motorcycle windshield bag of claim 9 wherein the flap is secured to the second portion of the front wall using a fastening means.

11. The removable motorcycle windshield bag of claim 10 wherein the fastening means comprises zippers, snaps, Velcro, or buttons.

\* \* \* \* \*